(No Model.)

G. H. IVES.
MIXING MACHINE FOR BAKERIES.

No. 325,933. Patented Sept. 8, 1885.

WITNESSES:
M. B. Seeley
D. J. Kelsey

INVENTOR
Geo. H. Ives
BY George D. Seymour
ATTORNEY

UNITED STATES PATENT OFFICE.

GEORGE H. IVES, OF NEW HAVEN, CONNECTICUT.

MIXING-MACHINE FOR BAKERIES.

SPECIFICATION forming part of Letters Patent No. 325,933, dated September 8, 1885.

Application filed August 11, 1884. (No model.)

*To all whom it may concern:*

Be it known that I, GEORGE H. IVES, residing at New Haven, in the county of New Haven and State of Connecticut, have invented certain new and useful Improvements in Mixing-Machines for Bakeries; and I do declare the following to be a full, clear, and exact description of the same, reference being had to the accompanying drawings, which form a part of this specification.

My invention relates to an improved mixing and beating apparatus for bakeries, the object being to produce a device of such description which shall be effective in use, easily cleaned, and durable.

With these ends in view my invention consists in certain details of construction and combinations of parts, as will be hereinafter described, and pointed out in the claims.

Figure 1:
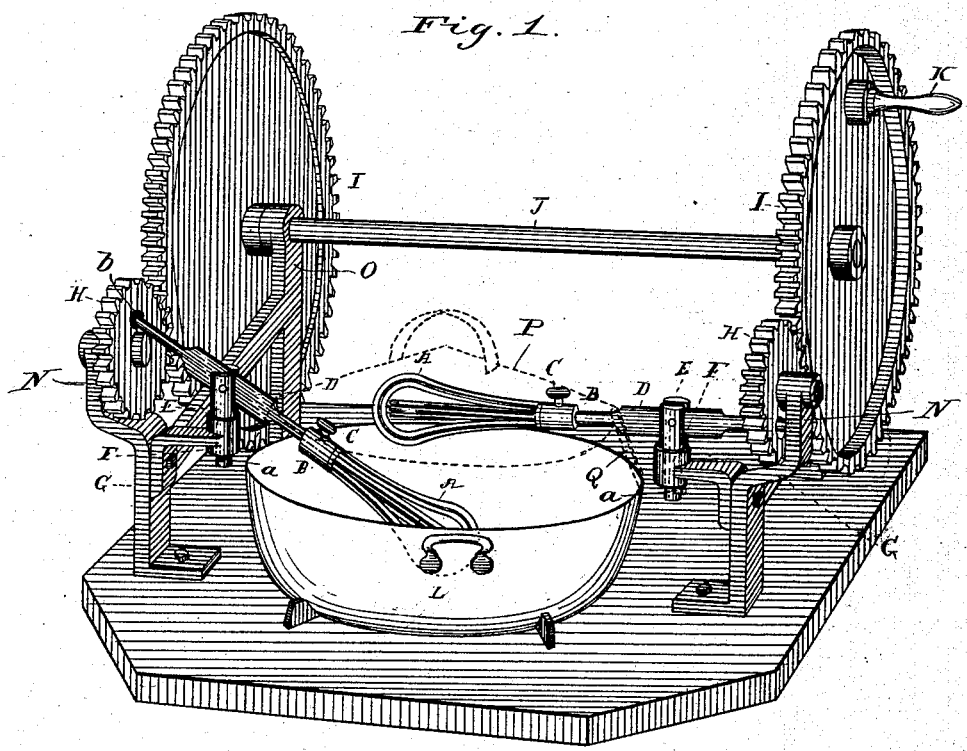
Figure 2:
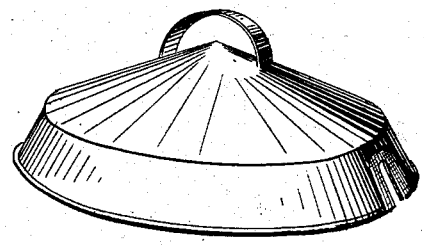

In the accompanying drawings Figure 1 is a perspective view of one form which my improvement may assume, and Fig. 2 is a similar detached view of the cover thereof.

As herein shown, the apparatus is provided with two skeleton beaters or whippers, each composed of loops A and a stock, B, furnished with a thumb-nut, C, extending toward and beyond each other from opposite directions, and detachably secured, respectively, to the contiguous ends of levers D D, pivoted so as to have free vertical movement in slotted bearings E E, swiveled and removably secured by pins $a$ $a$ in sleeves F F, located at the ends of arms M M, secured to the frames G G of the machine and extending toward each other. The outer ends of the said levers are flexibly and eccentrically connected with pinions H H, centered in arms N N, extending upward from the frames aforesaid and provided with flaring openings $b$, receiving the said ends of the levers, and respectively arranged so that the beaters will each clear the other. The pinions aforesaid mesh with driving-gears I I, one of which is provided with a handle, K, and which are connected by a shaft, J, mounted in arms O, extending upward from the frames of the machine. A removable shallow receptacle or dish, L, receives the material to be mixed and beaten or whipped, and a cover, P, having slots Q Q, is provided for setting over the levers onto the said receptacle after it has been placed under the beaters.

By virtue of the described construction and arrangement of parts the beaters are independently revolved on inclined axes converging or intersecting in the receptacle in eccentric paths, carrying the beaters through a full and deep sweep thereof, and then almost horizontally over its mouth, whereby scattering is in great measure avoided, and a shallow receptacle of ordinary form and adapted to be set under the beaters without removing and replacing them is made available. By employing two beaters and arranging them to extend toward and beyond each other from opposite directions is secured a coaction greatly promoting the efficiency of the machine.

In using the machine the material to be mixed and beaten or whipped is placed in the receptacle, which is then set under the beaters, previously brought into position for the purpose. When the work is done, the dish is removed, with its contents, and the beaters are detached, cleaned, and replaced.

The machine does not require a special receptacle, but any that can be set under the beaters will answer. A dish having a concaved bottom is, however, preferred. A cover will not always be necessary, as scattering is in great measure avoided by the peculiar mode of operating the beaters. It is not essential that they should be skeleton in structure or that they should extend beyond each other, but such construction and arrangement are preferred.

If desired, the driving connections herein shown may be replaced in whole or in part by equivalent devices adapted to operate the beaters in the same way. I would, therefore, have it understood that I do not limit myself to the exact construction and arrangement of parts shown and described, but hold myself at liberty to make such changes and alterations as fairly fall within the spirit and scope of my invention.

I am aware that a single beater having a circular motion on an inclined axis is not new, and hence do not claim the operation of a beater on an inclined axis, broadly.

Having fully described my invention, what

I claim as new, and desire to secure by Letters Patent, is—

1. A mixing and beating machine having independent beaters extending toward each other from opposite directions, a receptacle located beneath them, and means for revolving them on inclined axes converging in the receptacle, substantially as set forth.

2. A mixing and beating machine having independent beaters extending toward and beyond each other, a receptacle located beneath them, and means for revolving them on inclined axes converging in the receptacle, substantially as set forth.

3. A mixing and beating machine having independent beaters revolving on inclined axes through eccentric paths, as described, and a receptacle located beneath them, substantially as set forth.

4. A mixing and beating machine having independent beaters extending toward each other from opposite directions and revolving on inclined axes through eccentric paths, as described, a receptacle located beneath them, and a cover for the receptacle adapted to fit over them, substantially as set forth.

5. A mixing and beating machine having independent removable beaters extending toward and beyond each other from opposite directions and revolving on inclined axes through eccentric paths, as described, and a receptacle located beneath them, substantially as set forth.

6. A mixing and beating machine having skeleton beaters extending toward each other from opposite directions and revolving on inclined axes through eccentric paths, as described, and a removable receptacle, substantially as set forth.

7. A mixing and beating machine having removable skeleton beaters extending toward and beyond each other from opposite directions and revolving on inclined axes through eccentric paths, as described, and a removable receptacle, substantially as set forth.

8. A mixing and beating machine having beaters, a receptacle, levers to which the beaters are attached, universal bearings for the levers, and pinions centered above the said bearings and having the levers flexibly and eccentrically connected with them, subsiantially as set forth.

In testimony whereof I have signed this specification in the presence of two subscribing witnesses.

GEO. H. IVES.

Witnesses:
M. S. SEELEY,
D. J. KELSEY.